United States Patent [19]

Burgdorf

[11] 4,262,968

[45] Apr. 21, 1981

[54] BRAKE PRESSURE REGULATOR WITH BY-PASS

[75] Inventor: Jochen Burgdorf, Offenbach-Rumpenheim, Fed. Rep. of Germany

[73] Assignee: ITT Industries, Inc., New York, N.Y.

[21] Appl. No.: 97,241

[22] Filed: Nov. 26, 1979

[30] Foreign Application Priority Data

Dec. 15, 1978 [DE] Fed. Rep. of Germany ....... 2854164

[51] Int. Cl.³ .............................................. B60T 8/26
[52] U.S. Cl. .................................... 303/6 C; 188/349
[58] Field of Search ............ 303/6 C; 188/349, 151 A

[56] References Cited

U.S. PATENT DOCUMENTS

| | | | |
|---|---|---|---|
| 3,975,059 | 8/1976 | Orzel | 303/6 C |
| 4,068,900 | 1/1978 | Doerfler et al. | 188/349 X |

FOREIGN PATENT DOCUMENTS 1928647 12/1970 Fed. Rep. of Germany .......... 303/6 C
2163645 7/1972 Fed. Rep. of Germany .

Primary Examiner—Douglas C. Butler
Attorney, Agent, or Firm—John T. O'Halloran; Alfred C. Hill

[57] ABSTRACT

In order to prevent an excessive braking of the rear wheels of the vehicle, brake pressure regulators are incorporated in the rear wheel brake circuit generally including a control piston and a control valve. To prevent the regulator from becoming effective upon failure of the front wheel brake circuit, a by-pass is provided which is opened by failure of the front wheel brake circuit. The known regulators of this type are expensive to manufacture and necessitate much space. The brake pressure regulator with by-pass of the present invention has the by-pass between the inlet chamber and the outlet chamber disposed in the control piston of the regulator. The by-pass terminates at one end of the control piston close to a closure piston subject to pressure from the front wheel brake circuit to maintain the by-pass closed as long as the front wheel brake circuit is intact.

8 Claims, 1 Drawing Figure

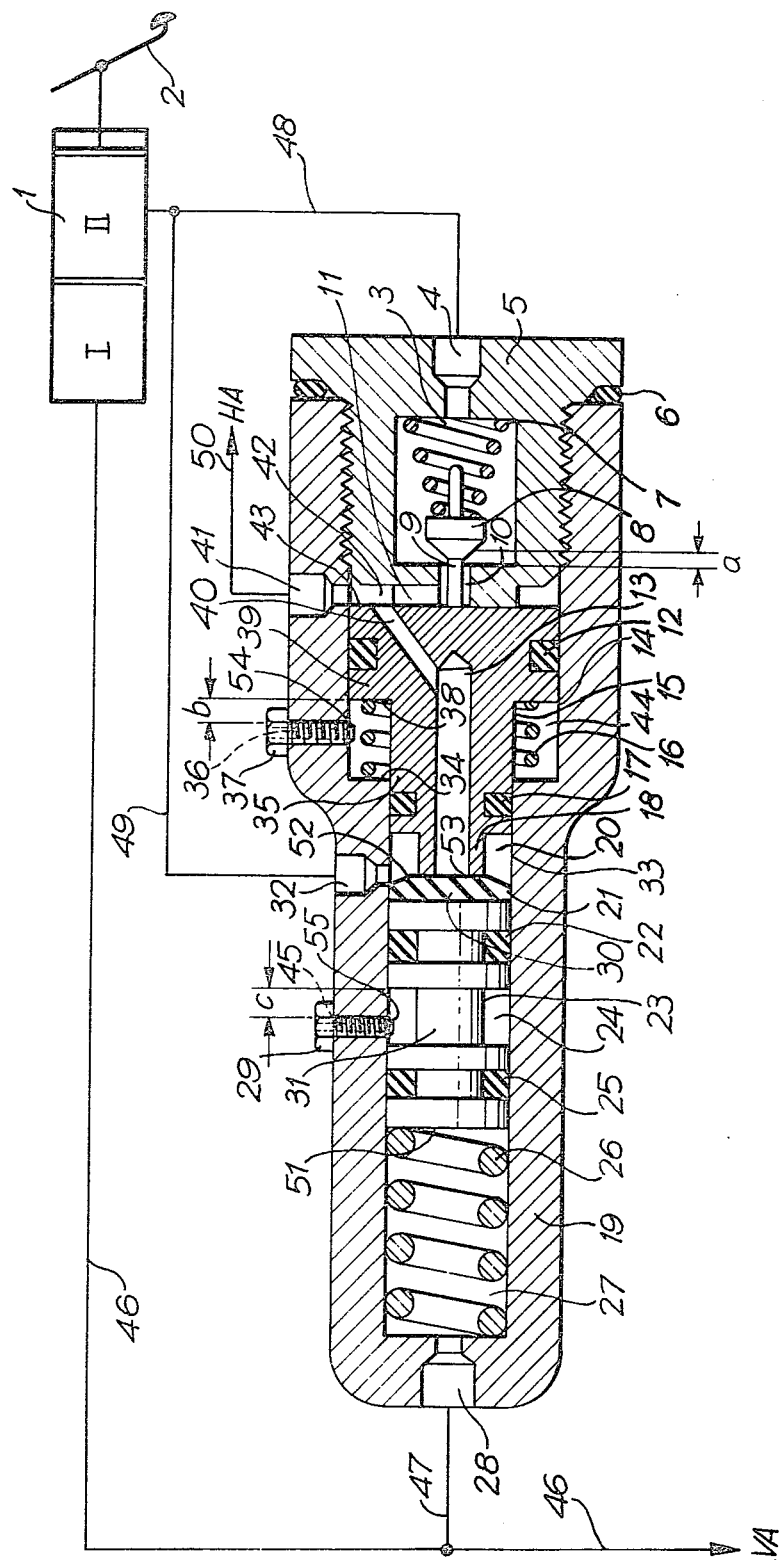

BRAKE PRESSURE REGULATOR WITH BY-PASS

BACKGROUND OF THE INVENTION

This invention relates to a brake pressure regulator with a by-pass for a vehicle brake system including a first brake circuit associated with the front wheels and a second brake circuit associated with the rear wheels. The wheel cylinders of the first brake circuit are connected to a first pressure chamber of a tandem master cylinder and the wheel cylinders of the second brake circuit are connected to a regulator outlet chamber of the brake pressure regulator and a second pressure chamber of the tandem master cylinder is connected to a regulator inlet chamber of the brake pressure regulator. The pressure regulator includes a control piston and a valve member is provided in a first pressure fluid line between inlet chamber and outlet chamber. The control piston is subjected to the pressure of the outlet chamber and to the pressure of the inlet chamber and a second pressure fluid line is arranged between the inlet chamber and the outlet chamber to by-pass the control piston and second pressure fluid line is normally sealed with respect to the pressure of the second brake circuit by means of a closure piston acted upon by a spring force and having the pressure of the first brake circuit acting thereon.

A brake pressure regulator of the aforementioned type is known from German patent DE-AS No. 2,163,635. An axial bore in the housing of the brake pressure regulator accommodates an insert having several passageways and providing a tight isolation between inlet and outlet. A bore connecting directly with the outlet terminates towards the inlet side in a cup-type body into which a closure plug is sealingly inserted, with the plug being held in the closing position by a spring and being acted upon by the pressure of the first brake circuit in opposition to the outlet pressure. The housing of the brake force regulator accommodates a further bore connecting with the inlet and terminating in the regulator inlet chamber of the pressure regulator arranged at right angles to the insert. The regulator outlet chamber communicates direct with the outlet through the passageways provided in the insert. With the first brake circuit intact, the closure plug remains tight in the cup-type body, and pressure fluid is allowed to flow from the inlet to the outlet only via the controlled member. However, in the event of failure of the first brake circuit, the controlled pressure in the passageways of the insert will push the closure plug out of the cup-type body against the force of the spring, thereby opening the direct connection from the inlet to the outlet which by-passes the controlled member. This design is, however, particularly complicated and, consequently, expensive to manufacture. In additon, the arrangement of the pressure regulator at right angles to the housing of the brake force regulator necessitates unfavorably much space which is not in line with today's demands for minimum space requirements.

German Patent DE-OS No. 1,928,647 shows another version of a brake pressure regulator with by-pass. Therein, a conventionally used pressure regulator is by-passed by a power system including a by-pass valve. This valve comprises a piston sealed to and slidable in a housing, with the piston head being of a diameter smaller than that of the remaining piston and carrying a sealing plate. The bore accommodating the piston lin the valve housing is divided into two pressure chambers by the piston. The first pressure chamber is pressurized by the pressure of the first brake circuit so that the piston head is urged into abutment with the inlet connected to the master cylinder and arranged axially to the piston, thereby closing the inlet bore of the first pressure chamber. The inlet bore terminates in a tapering truncated cone so that only the area of the inlet that is necessary to provide a seal abuts the sealing plate of the piston to thereby isolate the second pressure chamber and the wheel cylinders of the controlled brake circuit, which wheel cylinders connect with the second pressure chamber through an outlet bore, from the inlet. In the event of failure of the first brake circuit, the pressure in the second pressure chamber and the pressure in the inlet will cause an abrupt displacement of the piston and open the connection from the master brake cylinder to the wheel cylinders, which connection by-passes the controlled member. Though the separate arrangement of the components may permit a better utilization of the space available, the amount of pressure pipes involved is substantial. This piping system requires the added provision of sealing screw connections and tees resulting in increased susceptibility to trouble in the brake system and higher costs.

SUMMARY OF THE INVENTION

It is an object of the present invention to provide a brake pressure regulator with by-pass which overcomes the disadvantages described above, requires little space and keeps the manufacturing and assembly costs low by means of simple construction and minimum piping requirements.

This object is achieved by the present invention by arranging the by-pass between inlet chamber and outlet chamber in the control piston of the pressure regulator, with the by-pass terminating at the control piston's end surface close to the closure piston and with the closure piston bearing against the control piston's end surface directly or by means of a closure element. By this arrangement, with the control in operation, the closure piston and the control piston perform all axial control movements as one, while in the event of a failure of the first brake circuit, the pressure of the second brake circuit separates the closure piston from the control piston against the force of the spring, and the by-pass is opened. This arrangement ensures further that upon the failure of the first brake circuit the by-pass operates safely in contrast to rigid arrangements where the by-pass may become inoperative because it got stuck due to it being rarely used.

By arranging for the by-pass to terminate in a tubular extension of the control piston on the control piston's end surface close to the closure piston, with the extension passing through a chamber connected to the second pressure chamber of the tandem master cylinder, the pressurized space is only slightly reduced and the pressure acting on the remaining outward annular area of the closure piston and of the control piston operates to separate the two pistons.

Because the closure piston carries a sealing plate on the side close to the control piston, it is also possible to use the sealing plate as the seal for the closure piston in the bore.

The closure piston's outside diameter is advantageously of such a dimension that it corresponds to the outside diameter of the piston step on the side close to the closure piston. This obviates the necessity of providing a separate guiding for the closure piston in the housing.

Because the closure piston is subjected to the controlled and uncontrolled pressure of the second brake circuit, the total possible area of the closure piston is subjected to pressure in the opening direction, thus ensuring safe opening in the event of failure of the first brake circuit.

The provision of stop means limiting the axial displacement travels of the pistons prevent detrimental compression of the springs.

Because the closure travel of the valve member is smaller than the axial displacement travel of the control piston whose displacement travel is, in turn, smaller than the axial displacement travel of the closure piston, it is ensured, on the one hand, that the valve member closes safely, and, on the other hand, a defined end position is provided for all pistons in which position the by-pass is open.

Designing the by-pass such that, when load is removed from the brake, the pressure fluid flows back through the by-pass, with the fluid volume flowing through the by-pass within a unit of time being greater than the fluid volume flowing through the passageway of the pressure regulator within the same unit of time, the pressure is very rapidly reduced at the wheel cylinders of the rear axle when the brake is relieved of load.

DESCRIPTION OF THE DRAWINGS

The above-mentioned and other features and objects of the present invention and the manner of obtaining them will become more apparent by reference to the following description taken in conjunction with the drawing, the single FIGURE of which is a longitudinal cross sectional view of a brake pressure regulator with by-pass in accordance with the principles of the present invention.

DESCRIPTION OF THE PREFERRED EMBODIMENT

Referring to the figure, a housing 19 includes a stepped bore sealed and closed against atmosphere by a plug 5 screwed into it and a ring seal 6. Plug 5 includes an inlet chamber 3 connecting with the pressure chamber II of the tandem master cylinder 1 via fluid port 4 and terminating, via fluid passageway 10, into an outlet chamber 42 formed by plug 5 and control piston 15 which is arranged to slide in section 14 of the stepped bore of the housing. Outlet chamber 42 is connected to the wheel cylinders, not shown, of the rear axle via fluid port 41. On its end surface close to the control piston 15, plug 5 includes radial openings 11 ensuring the flow of pressure fluid from inlet chamber 3 to outlet chamber 42 with the control piston 15 in abutment with the plug 5.

Extending through fluid passageway 10 is the pin-like projection 9 of the valve plate 8 which is held in the closing direction by a preloaded spring 7. The pin-like projection 9 of the valve plate 8 abuts with the end surface 43 of the control piston 15 such that the valve is open by valve closure travel a when the control piston 15 is in abutment with the plug 5. Control piston 15 is formed as a stepped piston, the larger-diameter portion 39 of which is arranged to slide in section 14 of the stepped bore, the middle-diameter portion 35 of which is arranged to slide in the smaller-diameter section 33 of the stepped bore, while the third, smallest-diameter portion 18 extends into a pressure chamber 20 which communicates with pressure chamber II of tandem master cylinder 1 via fluid port 32. Portions 35 and 39 of control piston 15 carry ring seals 12 and 17 so that chamber 44 is free from pressure fluid. A vent 36 connects chamber 44 with atmosphere so that pressure compensation can occur when the piston is moved. Vent 36 is arranged in a screw 37 extending into chamber 44 and thus limiting the axial displacement travel b of the control piston 15. A preloaded spring 16 bearing against step 34 of the stepped bore and against step 38 of the control piston 15 holds the control piston in its inactivated position in abutment with the plug 5. The control piston 15 has an axial blind-end bore 13 extending from the end surface of portion 18 into the piston and connected to a bore 40 extending diagonally to the axis of the control piston and terminating at the control piston's end surface 43. The axial blind-end bore 13 is sealed off by a closure piston 31 whose diameter corresponds to that of section 33 of the stepped bore, by the closure piston's 31 head which is provided with a sealing plate 21 being urged into abutment with the annular end surface 30 of the tubular portion 18 of the control piston 15 by means of a spring 26 bearing against the housing 19 of the brake force regulator. The chamber 27 which is formed by the housing 19 and the closure piston 31 is connected to the first or front axle brake circuit through a fluid port 28.

Closure piston 31 has a circumferential recess 23 into which a screw 29 having an opening 45 extends and which limits the axial displacement travel c of the closure piston 31. To the right- and left-hand side of the recess 23, the piston carries ring seals 22, 25 so that the first brake circuit is isolated from the second brake circuit by a chamber 24 connected to atmosphere.

With both brake circuits intact, actuation of pedal 2 causes the compression of pressure fluid in pressure chambers I and II of tandem master cylinder 1. Via line 46, the pressure in pressure chamber I will propagate to the wheel cylinders of the front axle, and via line 47, the pressure will also be present in pressure chamber 27 of the brake pressure regulator. The pressure in pressure chamber II will also be present in the inlet chamber 3 and pressure chamber 20 via lines 48 and 49 and propagate to the wheel cylinders of the rear axle via fluid passageway 10, outlet chamber 42, outlet port 41 and line 50.

Closure piston 31 whose sealing plate 21 in the unpressurized state of the brake pressure regulator is urged into abutment with the annular end surface 30 of the control piston by spring 26, thereby safely sealing off the connection 13, 40 to the outlet chamber 42, has acting on its full end surface 51 the pressure of the first brake circuit in the direction of the control piston, while the surface of the closure piston opposite end surface 51 is divided into three different surfaces subjected to pressure. The outer annular surface 52 is subjected to the uncontrolled pressure of the second brake circuit, the circular surface 53 is subjected to the controlled pressure of the second brake circuit, and the surface 30 which is in contact with the control piston 15 remains unpressurized. Thus, with the first brake circuit intact, safe closing is ensured in all operating states, because the sum of all forces acting on the closure piston 31 is always a press-on force acting on control piston 15.

From a specific pressure on, the pressure acting on end surface 43 of control piston 15 will displace the control piston against the force of springs 16 and 26 and the pressure of the first brake circuit, acting on the end surface 51 of the closure piston. The preloaded spring 7 will urge the valve plate 8 into the fluid passageway 10 and close the latter so that inlet chamber 3 and outlet chamber 42 are isolated from one another. With the pressure continuing to increase, the increasing pressure in the first brake circuit and thus in pressure chamber 27 will shift the closure piston 31 with the abutting control piston 15 to the right and open the valve again via projection 9 of the valve plate 8. Fluid is allowed to be fed from pressure chamber 3 until the pressure acting on the control piston 15 displaces it again to the left together with the abutting closure piston 31. With the control in operation, the control piston 15 and closure piston 31 act as one. All axial control movements are performed together without the by-pass established by bores 13, 40 being opened.

When pressure is removed from the fluid, the springs 16,26 will return the pistons to their initial positions, and it is irrelevant for the function of the by-pass whether or not it is temporarily opened when the pistons slide back.

By favorably dimensioning the circular surface 53, which is subjected to the controlled pressure of the second brake circuit, and the force of spring 26, it is possible to reduce the major part of the pressure at the wheel cylinders via the by-pass which permits a more rapid pressure decrease at the wheel cylinders of the rear axle.

If the first brake circuit fails during a braking operation, closure piston 31 will be shifted to the left against the force of spring 26 by the uncontrolled pressure of the second brake circuit acting on the annular surface 52, as well as by the controlled pressure of the second brake circuit acting on the circular surface 53, thereby opening the by-pass 13,40. Pressure chamber II of tandem master cylinder 1 will be directly connected to the wheel cylinders (not shown) of the rear axle via line 49, inlet port 32, pressure chamber 20, bores 13,40, outlet chamber 42, outlet port 41 and line 50, and a fluid connection by-passing the pressure regulator is established. With the pressure being at its maximum, the control piston 15, conditioned by its greater effective end surface, will be displaced to the left up to the stop 54, and closure piston 31 will likewise be shifted to the left up to the stop 55. Since the axial displacement travel b of the control piston 15 is smaller than the axial displacement travel c of the closure piston 31, the by-pass opening will remain open also in this end position.

When dimensioning the axial displacement travels it is absolutely necessary that valve closure travel a is smaller than end play b of control piston 15 whose displacement travel b, in turn, must be smaller than end play c of the closure piston 31.

It is a particular advantage of the present invention that it provides for an optimum pressure decrease via the by-pass because the spring closure force acting on the closure piston 31 and the by-pass can be dimensioned independently of the control function of the pressure regulator. Thus, it is possible to adjust the pressure regulator solely to an optimum control behavior, the force of spring 7 thus defining the opening pressure differential.

While I have described above the principles of my invention in connection with specific apparatus it is to be clearly understood that this description is made only by way of example and not as a limitation to the scope of my invention as set forth in the objects thereof and in the accompanying claims.

I claim:
1. A brake pressure regulator with by-pass for a vehicle brake system comprising:
   a first brake circuit associated with front axle brake cylinders of a vehicle;
   a second brake circuit associated with rear axle brake cylinders of said vehicle;
   a housing having a longitudinal bore therein coaxial of a longitudinal axis;
   a control piston disposed in said bore coaxial of said axis;
   a valve member disposed in said bore coaxial of said axis in a cooperating relationship with an adjacent end of said control piston and in a first pressure fluid line between an inlet chamber disposed in said bore remote from said control piston and an outlet chamber disposed in said bore adjacent said control piston, said inlet and outlet chambers being in said second brake circuit;
   a second pressure fluid line disposed in said control piston having one end thereof connected to said inlet chamber and the other end thereof connected to said outlet chamber to by-pass said control piston when said first brake circuit fails, said one end of said second fluid line terminating in the other end of said control piston remote from said valve member; and
   a closure piston disposed in said bore coaxial of said axis adjacent said other end of said control piston, said closure piston abutting said other end of said control piston under control of a spring force and pressure in said first brake circuit to seal said second fluid line from presurre in said second brake circuit when said first brake circuit is intact.

2. A regulator according to claim 1, wherein said one end of said second fluid line terminates at an outer end surface of a tubular extension of said control piston adjacent said closure piston, said extension passing through a chamber connected to said second brake circuit.

3. A regulator according to claims 1 or 2, wherein said closure piston carries a sealing plate on the end thereof adjacent said control piston.

4. A regulator according to claim 3, wherein the outer diameter of said closure piston corresponds to the outer diameter of a central step of said control piston.

5. A regulator according to claim 3, wherein said closure piston is subjected to the controlled and uncontrolled pressure of said second brake circuit.

6. A regulator according to claim 3, further including a first stop means in said housing to limit the axial displacement of said control piston; and
a second stop means in said housing spaced from said first stop means to limit the axial displacement of said closure piston.

7. A regulator according to claim 6, wherein the closure travel of said valve member is smaller than the axial displacement of said control piston whose displacement is smaller than the axial displacement of said closure piston.

8. A regulator according to claim 3, wherein said second fluid line is dimensioned such that the fluid volume flowing therethrough within a unit of time is greater than the fluid volume flowing through said first fluid line within said unit of time.

* * * * *